United States Patent
Ishikura et al.

(10) Patent No.: US 12,483,509 B2
(45) Date of Patent: Nov. 25, 2025

(54) COMMUNICATION CONTROL DEVICE, COMMUNICATION CONTROL METHOD, AND RECORDING MEDIUM

(71) Applicant: NEC Corporation, Tokyo (JP)

(72) Inventors: Satoshi Ishikura, Tokyo (JP); Atsushi Shiroyama, Tokyo (JP); Naohiro Noji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 383 days.

(21) Appl. No.: 18/202,143

(22) Filed: May 25, 2023

(65) Prior Publication Data

US 2023/0396558 A1 Dec. 7, 2023

(30) Foreign Application Priority Data

Jun. 2, 2022 (JP) .................................. 2022-090306

(51) Int. Cl.
*H04L 47/2491* (2022.01)
*H04L 47/2408* (2022.01)
*H04L 47/31* (2022.01)

(52) U.S. Cl.
CPC ...... *H04L 47/2491* (2013.01); *H04L 47/2408* (2013.01); *H04L 47/31* (2013.01)

(58) Field of Classification Search
CPC .. H04L 47/2491; H04L 47/2408; H04L 47/31
See application file for complete search history.

(56) References Cited

U.S. PATENT DOCUMENTS

2003/0126286 A1* 7/2003 Lee ..................... H04L 47/2441
    709/238
2020/0084657 A1* 3/2020 Lee ........................ H04W 8/04

FOREIGN PATENT DOCUMENTS

JP    2019-532582 A    11/2019
JP    2022-511749 A    2/2022

* cited by examiner

*Primary Examiner* — Minh Chau Nguyen
(74) *Attorney, Agent, or Firm* — Sughrue Mion, PLLC (57) ABSTRACT

A communication control device included in a user plane of a mobile communication system in which a control plane and the user plane are separated includes: a packet transfer unit that transfers a packet to a network apparatus; a reception unit that receives, from the control plane, a basic DSCP being a DSCP set to each QoS flow by the control plane according to a QoS class; and a measurement unit that measures a use band amount of the packet for each of the QoS flow, and the packet transfer unit determines a new DSCP being a DSCP to be stored in the packet to be transferred, based on the basic DSCP and the use band amount of the QoS flow to which the packet to be transferred belongs, and stores the new DSCP in the packet to be transferred to the network apparatus.

10 Claims, 8 Drawing Sheets

| 5QI | BASIC DSCP |
|---|---|
| 1 | AF41 |
| 2 | AF42 |
| 3 | EF |
| 4 | AF41 |
| 5 | AF21 |
| 6 | AF31 |
| 7 | AF11 |
| 8 | AF11 |
| 9 | BE |

| BASIC DSCP | USE BAND AMOUNT | | |
|---|---|---|---|
| | Green | Yellow | Red |
| AF41 | AF41 | AF41 | DISCARD |
| AF42 | AF42 | AF42 | DISCARD |
| EF | EF | EF | DISCARD |
| AF41 | AF41 | AF43 | DISCARD |
| AF21 | AF21 | AF22 | DISCARD |
| AF31 | AF31 | AF32 | DISCARD |
| AF11 | AF11 | AF12 | DISCARD |
| AF11 | AF11 | AF12 | DISCARD |
| BE | BE | BE | DISCARD |

Fig.9

COMMUNICATION CONTROL DEVICE, COMMUNICATION CONTROL METHOD, AND RECORDING MEDIUM

This application is based upon and claims the benefit of priority from Japanese Patent Application No. 2022-090306, filed on Jun. 2, 2022, the disclosure of which is incorporated herein in its entirety by reference.

TECHNICAL FIELD

The present invention relates to a communication control device and the like.

BACKGROUND ART

In a fifth generation mobile communication system (5th generation (5G)), a 5G quality of service (QoS) identifier (5QI) defined by a third generation partnership project (3GPP) (registered trademark) is used as an indicator of a QoS class in a mobile network.

When a terminal requests call connection, a session management function (SMF) determines a QoS rule to be applied, and notifies a user plane function (UPF). Then, the UPF applies the QoS rule to a user packet. Note that a packet flow in a unit to which the QoS rule is applied is referred to as a QoS flow.

The QoS rule notified to the UPF includes a differentiated services code point (DSCP). The SMF determines the DSCP, based on the 5QI. The SMF notifies the UPF of the DSCP by setting the DSCP as a parameter of a packet forwarding control protocol (PFCP).

Meanwhile, priority control in an Internet protocol (IP) network is performed based on the DSCP being set to a field of a type of service (ToS) of an IP header.

Thus, a general UPF stores a DSCP notified from an SMF in an IP header of a user packet, and transfers the user packet to a network apparatus. In this way, the network apparatus being a transfer destination of the user packet can recognize a priority degree of a packet and perform priority control. Note that storing a DSCP in a packet may be referred to as DSCP marking.

Further, as a related art, there are techniques described in PTL 1 (Japanese Unexamined Patent Application Publication (Translation of PCT Application) No. 2022-511749) and PTL 2 (Japanese Unexamined Patent Application Publication (Translation of PCT Application) No. 2019-532582).

In the method described above, a general UPF stores a DSCP notified from an SMF in a packet as it is, and transfers the packet to a network apparatus. In this case, the UPF does not consider a use band amount of the packet. Thus, the UPF cannot re-determine a DSCP to be reflected in a packet, based on a use band amount of the packet. When a use band amount cannot be reflected in a DSCP of a packet, even though a communication operator desires to perform priority control according to the use band amount, the priority control cannot be performed. For example, a communication operator cannot perform control for reducing a priority degree of communication in which a use band amount exceeds a certain amount to be lower than a priority degree of communication in which a use band amount is less than the certain amount.

Further, in a mobile communication system before a control plane (C-Plane) and a user plane (U-Plane) are separated, a QoS class identifier (QCI) being an indicator of a QoS class can be notified from the C-Plane to the U-Plane by an interface definition unique to a vendor. Thus, the U-Plane can directly refer to the indicator of the QoS class. However, in the 5G, the C-Plane and the U-Plane are separated, and a 5QI being an indicator of a QoS class is not notified to the U-Plane. Thus, there is also a problem that the UPF cannot perform the DSCP marking by directly using the indicator of the QoS class.

In this way, in a mobile communication system in which a C-Plane and a U-Plane are separated, a general UPF cannot determine a DSCP to be set to a packet according to a QoS class and a band use amount.

SUMMARY

An object of the present invention is, in view of the problem described above, to provide a communication control device and the like that are able to determine a DSCP to be set to a packet according to a QoS class and a band use amount.

In one aspect of the present invention, a communication control device is a communication control device included in a user plane of a mobile communication system in which a control plane and the user plane are separated, and includes: a packet transfer unit that transfers a packet to a network apparatus; a reception unit that receives, from the control plane, a basic DSCP being a DSCP being set to each QoS flow by the control plane according to a QoS class; and a measurement unit that measures a use band amount of the packet for each of the QoS flow, wherein the packet transfer unit determines a new DSCP being a DSCP to be stored in the packet to be transferred, based on the basic DSCP and the use band amount of the QoS flow to which the packet to be transferred belongs, and stores the new DSCP in the packet to be transferred to the network apparatus.

Further, in another aspect of the present invention, a communication control method includes, in a mobile communication system in which a control plane and a user plane are separated: receiving, from the control plane, a basic DSCP being a DSCP being set to each QoS flow by the control plane according to a QoS class; measuring a use band amount of a packet to be transferred for each of the QoS flow; determining a new DSCP being a DSCP to be stored in the packet to be transferred, based on the basic DSCP and the use band amount of the QoS flow to which the packet to be transferred belongs; and transferring, to a network apparatus, the packet in which the new DSCP is stored.

Further, in another aspect of the present invention, a communication control program recorded in a non-transitory computer-readable recording medium is a communication control program of a communication control device included in a user plane of a mobile communication system in which a control plane and the user plane are separated, and causes a computer to achieve: a packet transfer function of transferring a packet to a network apparatus; a reception function of receiving, from the control plane, a basic DSCP being a DSCP being set to each QoS flow by the control plane according to a QoS class; and a measurement function of measuring a use band amount of the packet for each of the QoS flow, and the packet transfer function determines a new DSCP being a DSCP to be stored in the packet to be transferred, based on the basic DSCP and the use band amount of the QoS flow to which the packet to be transferred belongs, and stores the new DSCP in the packet to be transferred to the network apparatus.

BRIEF DESCRIPTION OF THE DRAWINGS

Exemplary features and advantages of the present invention will become apparent from the following detailed description when taken with the accompanying drawings in which.

EXAMPLE EMBODIMENT

First Example Embodiment

A first example embodiment of the present invention will be described. One specific example of a communication control device 10 according to the first example embodiment is a communication control device 20 according to a second example embodiment described below.

Figure 1:
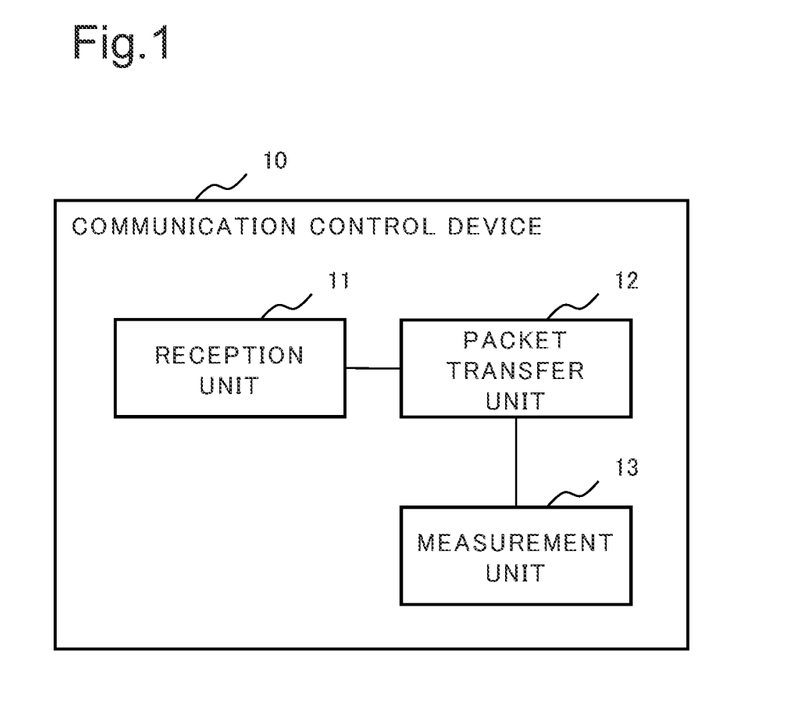
FIG. 1 is a diagram illustrating a configuration example of a communication control device according to a first example embodiment of the present invention.

FIG. 1 illustrates a configuration example of the communication control device 10 according to the present example embodiment. The communication control device 10 includes a reception unit 11, a packet transfer unit 12, and a measurement unit 13.

The communication control device 10 is included in a user plane of a mobile communication system in which a control plane and the user plane are separated.

The packet transfer unit 12 transfers a packet to a network apparatus.

The reception unit 11 receives a basic DSCP from the control plane. The basic DSCP is a DSCP set by the control plane. The basic DSCP is set to each QoS flow by the control plane. Further, the basic DSCP is set according to a QoS class.

The measurement unit 13 measures a use band amount of a packet for each QoS flow.

The packet transfer unit 12 determines a new DSCP, based on the basic DSCP and the use band amount of the QoS flow to which the packet to be transferred belongs. The new DSCP is a DSCP stored in the packet to be transferred. Then, the packet transfer unit 12 stores the new DSCP in the packet to be transferred.

Figure 2:
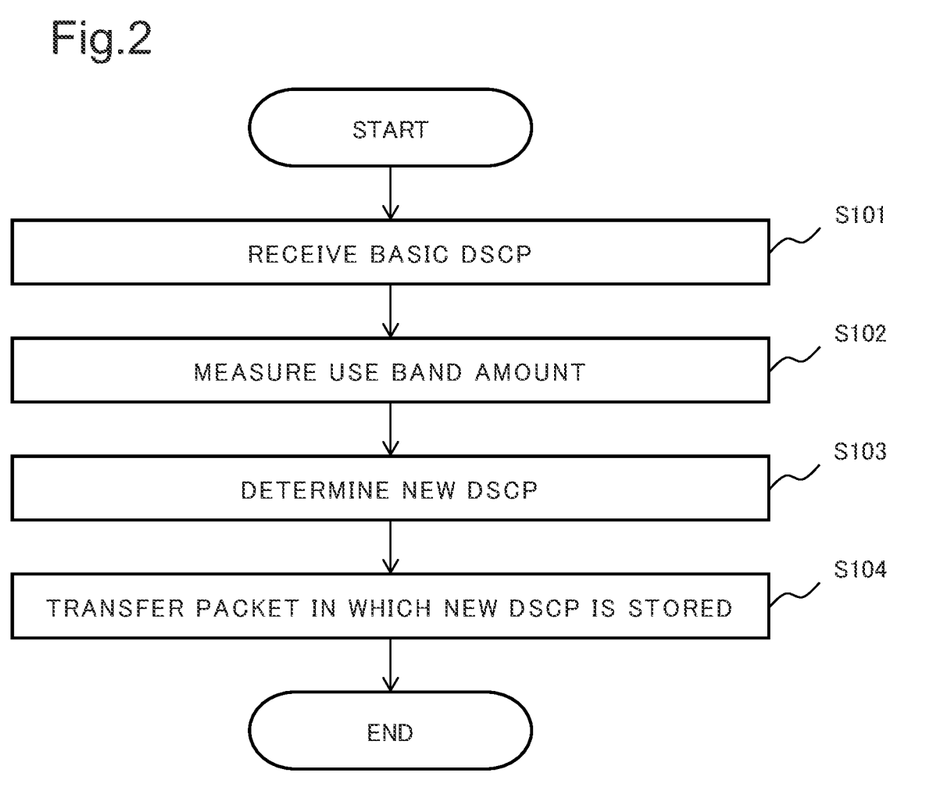
FIG. 2 is a diagram illustrating an example of an operation flow of the communication control device according to the first example embodiment of the present invention.

Next, FIG. 2 illustrates an example of an operation flow of the communication control device 10 according to the present example embodiment.

The reception unit 11 receives a basic DSCP from a control plane (step S101). The measurement unit 13 measures a use band amount of a packet for each QoS flow (step S102). The packet transfer unit 12 determines a new DSCP, based on the basic DSCP and the use band amount of the QoS flow to which the packet to be transferred belongs (step S103). Then, the packet transfer unit 12 transfers, to a network apparatus, the packet in which the new DSCP is stored (step S104).

As described above, in the first example embodiment of the present invention, the communication control device 10 includes the reception unit 11, the packet transfer unit 12, and the measurement unit 13. The communication control device 10 is included in a user plane of a mobile communication system in which a control plane and the user plane are separated. The packet transfer unit 12 transfers a packet. The reception unit 11 receives a basic DSCP from the control plane. The basic DSCP is a DSCP set by the control plane. The basic DSCP is set to each QoS flow by the control plane. Further, the basic DSCP is set according to a QoS class. The measurement unit 13 measures a use band amount of a packet for each QoS flow. The packet transfer unit 12 determines a new DSCP, based on the basic DSCP and the use band amount of the QoS flow to which the packet to be transferred belongs. The new DSCP is a DSCP stored in the packet to be transferred. Then, the packet transfer unit 12 stores the new DSCP in the packet to be transferred.

In this way, the communication control device 10 determines a new DSCP stored in a packet to be transferred, based on a basic DSCP set according to a QoS class, and a use band amount. In this way, the communication control device 10 can reflect a use band amount in a DSCP of a packet. Further, even when an indicator of a QoS class is not notified to a user plane in a mobile communication system in which a control plane and the user plane are separated, the communication control device 10 can determine a new DSCP, based on a basic DSCP. Thus, a DSCP to be set to a packet can be determined according to a QoS class and a band use amount.

Second Example Embodiment

Next, the communication control device 20 according to the second example embodiment of the present invention will be described.

Figure 3:
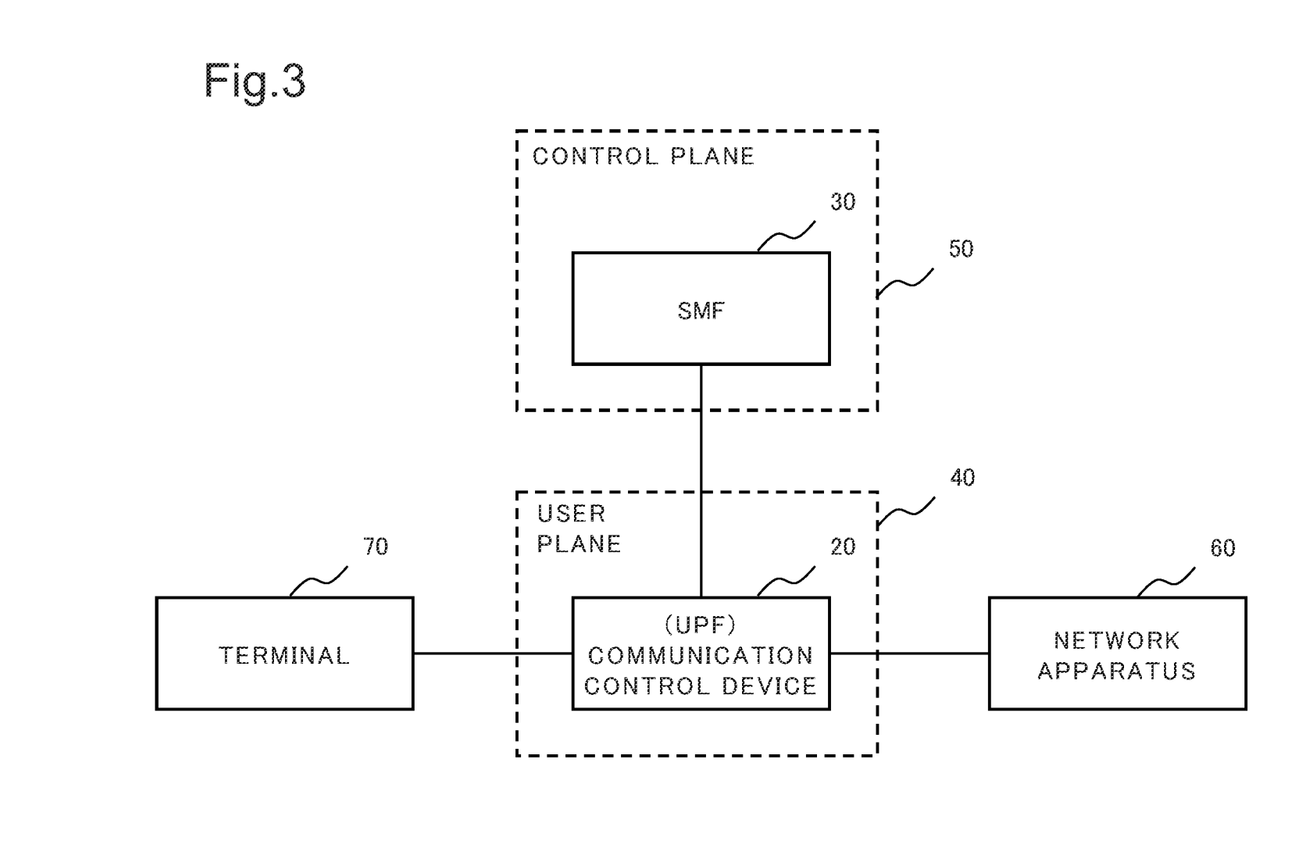
FIG. 3 is a diagram illustrating a configuration example of a system including a communication control device according to a second example embodiment of the present invention.

First, FIG. 3 illustrates a configuration example of a system including the communication control device 20 according to the present example embodiment.

In the present example embodiment, it is assumed that a control plane 50 and a user plane 40 of a mobile communication system are separated. For example, a 5G is a communication system in which the control plane 50 and the user plane 40 are separated.

An SMF 30 is included in the control plane 50. When a terminal requests call connection, the SMF 30 determines a DSCP for a QoS flow of the requested call connection. The DSCP determined by the SMF 30 is referred to as a basic DSCP. The basic DSCP is determined for each QoS flow. Further, the basic DSCP is determined based on a 5QI. The 5QI is an indicator of a QoS class. An application rule of the 5QI to the QoS flow is preset by an operation policy of a communication operator.

The SMF 30 notifies a UPF (the communication control device 20) of a basic DSCP. The SMF 30 notifies the UPF (communication control device 20) of the basic DSCP by setting the basic DSCP to a parameter of a PFCP.

Figure 4:
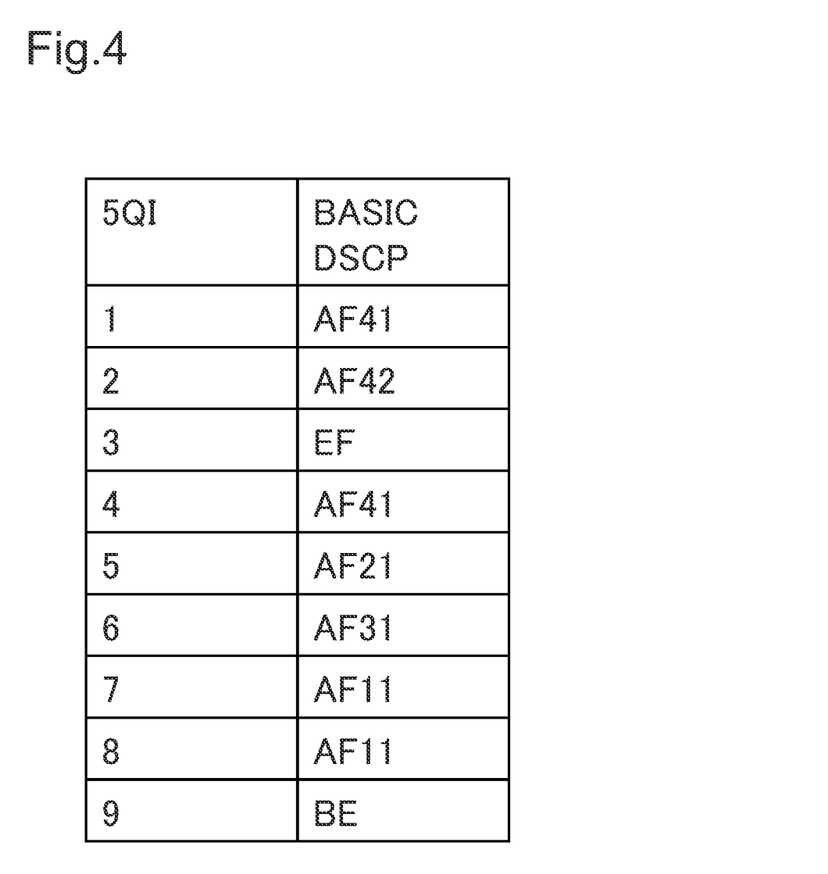
FIG. 4 is a diagram illustrating an example of a conversion table from a 5QI to a basic DSCP.

For example, the SMF 30 determines a basic DSCP according to a conversion table from a 5QI to a basic DSCP. FIG. 4 illustrates an example of the conversion table from the 5QI to the basic DSCP.

The communication control device 20 is included in the user plane 40. The communication control device 20 is, for example, a UPF. The communication control device 20 transfers, to a network apparatus 60, a user packet received from the terminal 70. The communication control device 20 stores a DSCP in the packet, and transfers the packet. A determination method of a DSCP to be stored in a packet will be described below.

The network apparatus 60 performs priority control according to the DSCP stored in the packet.

Figure 5:
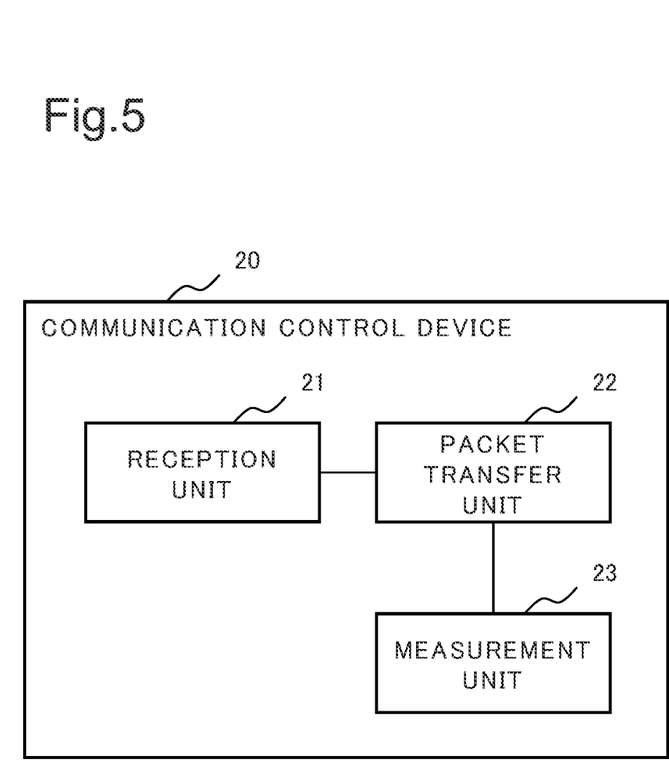
FIG. 5 is a diagram illustrating a configuration example of the communication control device according to the second example embodiment of the present invention.

Next, FIG. 5 illustrates a configuration example of the communication control device 20 according to the present example embodiment. The communication control device 20 according to the present example embodiment includes a reception unit 21, a packet transfer unit 22, and a measurement unit 23.

The packet transfer unit 22 transfers a packet from the terminal 70 to the network apparatus 60.

The reception unit 21 receives a basic DSCP from the control plane 50 (SMF 30). The basic DSCP is a DSCP set by the control plane 50 (SMF 30). The basic DSCP is set to each QoS flow. Further, the basic DSCP is set according to a QoS class (5QI).

The measurement unit 23 measures a use band amount of the packet transferred by the packet transfer unit 22 for each QoS flow. The measurement unit 23 measures the use band amount by, for example, a two rate three color marker (TrTCM). Note that a measurement method of a use band amount is not limited to the TrTCM.

In the TrTCM, a bit rate of a traffic is evaluated in three stages. In the communication control device 20, the measurement unit 23 holds, in advance, a first threshold value and a second threshold value in a storage unit (not illustrated) in association with a basic DSCP. Note that the first threshold value is greater than the second threshold value. The first threshold value is, for example, a maximum band being a maximum amount of a band that can be used by each QoS flow. The second threshold value is, for example, a guarantee band being a band amount that guarantees that each QoS flow can be used.

Then, the measurement unit 23 evaluates a bit rate of a traffic in three stages of Red/Yellow/Green, based on the first threshold value and the second threshold value associated with the basic DSCP. "Red" indicates that a bit rate exceeds the first threshold value. "Yellow" indicates that a bit rate exceeds the second threshold value and is equal to or less than the first threshold value. "Green" indicates that a bit rate is equal to or less than the second threshold value.

The packet transfer unit 22 determines a new DSCP, based on the basic DSCP and the use band amount of the QoS flow to which the packet to be transferred belongs. The new DSCP is a DSCP stored in the packet to be transferred. Then, the packet transfer unit 22 stores the new DSCP in the packet to be transferred.

The packet transfer unit 22 can recognize a QoS flow to which a packet to be transferred belongs by a QoS flow identifier (QFI) stored in the packet. The QFI is stored in the packet in a NodeB (NB) (not illustrated). The QFI is assigned to each QoS flow by an SMF.

The packet transfer unit 22 determines a new DSCP according to a conversion table from a basic DSCP and a use band amount to a new DSCP.

Figure 6:
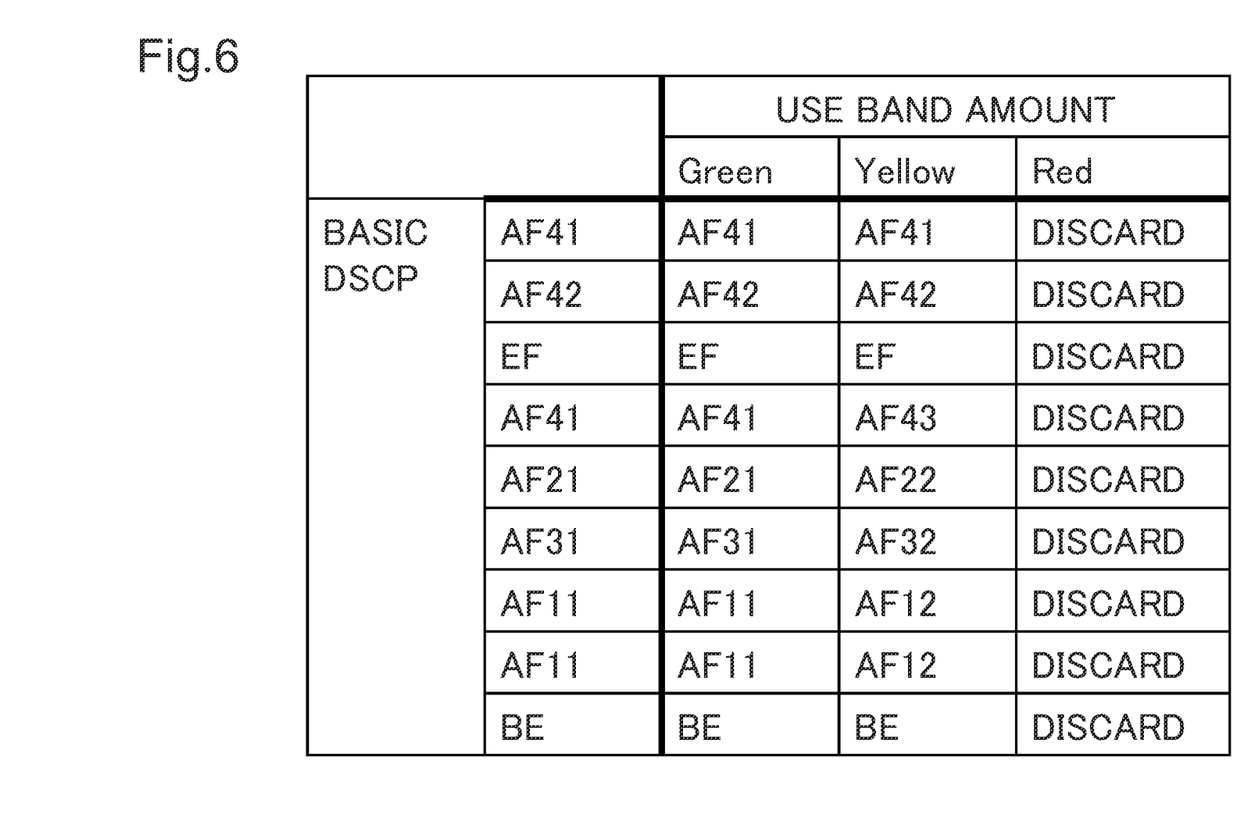
FIG. 6 is a diagram illustrating an example of a conversion table from the basic DSCP and a use band amount to a new DSCP.

FIG. 6 illustrates an example of a conversion table from a basic DSCP and a use band amount to a new DSCP. The example in FIG. 6 illustrates that, for example, when a basic DSCP is "AF41" and a use band amount is "Yellow", the packet transfer unit 22 determines a new DSCP as "AF43". In this way, control in such a way as to reduce a priority degree when a use band amount of a QoS flow is great can be achieved.

Further, the example in FIG. 6 illustrates that, for example, when a use band amount is "Red", the packet transfer unit 22 discards a packet regardless of a basic DSCP. In this way, when a use band amount of a QoS flow exceeds the first threshold value, the packet transfer unit 22 can discard a packet without transferring the packet to the network apparatus 60. Then, a possibility of occurrence of unintended discarding of a packet in the network apparatus 60 due to tightness of a band can be reduced.

Figure 7:
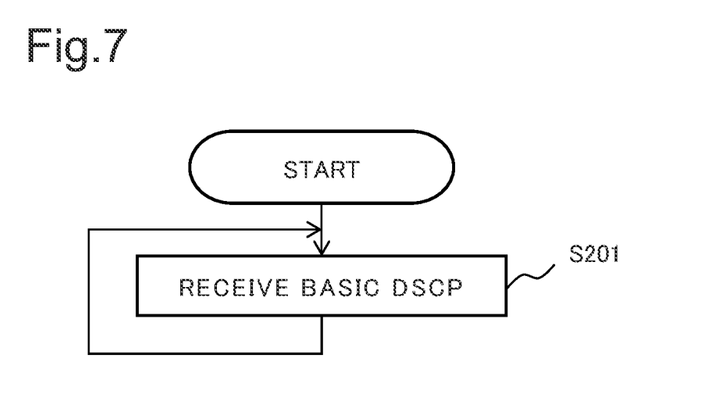
FIG. 7 is a diagram illustrating an example of an operation flow of the communication control device according to the second example embodiment of the present invention.
Figure 8:
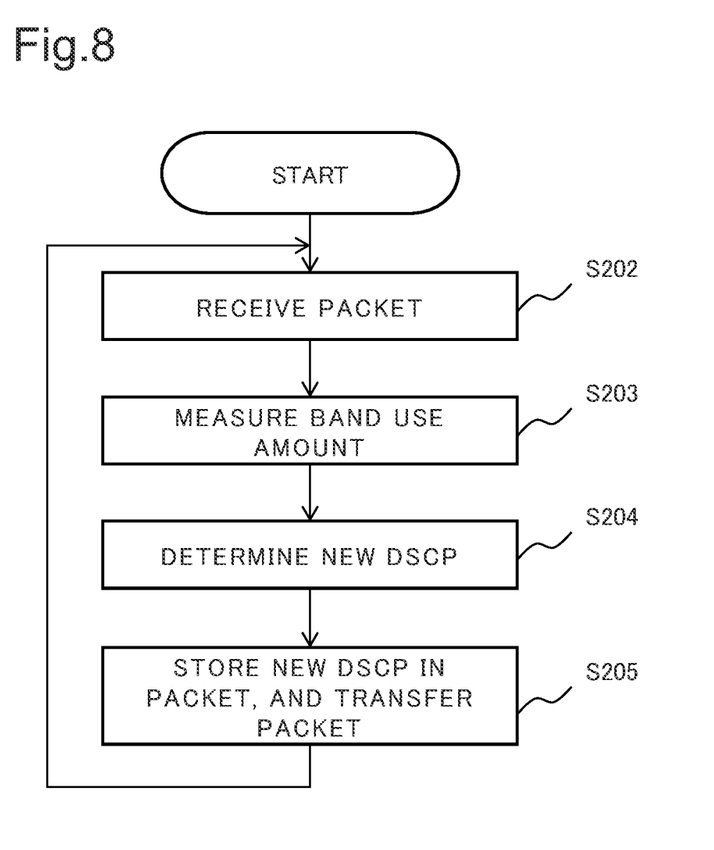
FIG. 8 is a diagram illustrating an example of an operation flow of the communication control device according to the second example embodiment of the present invention.

Next, FIGS. 7 and 8 illustrate examples of an operation flow of the communication control device 20 according to the present example embodiment. FIG. 7 is a diagram illustrating an example of an operation flow of the communication control device 20 with regard to the reception unit 21. FIG. 8 is a diagram illustrating an example of an operation flow of the communication control device 20 with regard to the measurement unit 23 and the packet transfer unit 22.

First, the example of the operation flow of the reception unit 21 will be described by using FIG. 7.

The reception unit 21 receives a basic DSCP from the control plane 50 (SMF 30) (step S201). When the terminal 70 requests call connection, the basic DSCP is notified from the control plane 50 to the communication control device 20. Further, the basic DSCP is notified for each QoS flow.

Next, the example of the operation flow of the packet transfer unit 22 and the measurement unit 23 will be described by using FIG. 8.

The packet transfer unit 22 receives a user packet from the terminal 70 (step S202). The measurement unit 23 measures a band use amount of a QoS flow to which the packet belongs (step S203). The packet transfer unit 22 determines a new DSCP stored in the packet, based on the basic DSCP and the band use amount of the QoS flow to which the packet belongs (step S204). Then, the packet transfer unit 22 transfers, to the network apparatus 60, the packet in which the new DSCP is stored (step S205).

As described above, in the second example embodiment of the present invention, the communication control device 20 includes the reception unit 21, the packet transfer unit 22, and the measurement unit 23. The communication control device 20 is included in a user plane of a mobile communication system in which a control plane and the user plane are separated. The packet transfer unit 22 transfers a packet. The reception unit 21 receives a basic DSCP from the control plane. The basic DSCP is a DSCP set by the control plane. The basic DSCP is set to each QoS flow by the control plane. Further, the basic DSCP is set according to a QoS class. The measurement unit 23 measures a use band amount of a packet for each QoS flow. The packet transfer unit 22 determines a new DSCP, based on the basic DSCP and the use band amount of the QoS flow to which the packet to be transferred belongs. The new DSCP is a DSCP stored in the packet to be transferred. Then, the packet transfer unit 22 stores the new DSCP in the packet to be transferred.

In this way, the communication control device 20 determines a new DSCP to be stored in a packet to be transferred, based on a basic DSCP set according to a QoS class, and a use band amount. In this way, the communication control device 20 can reflect a use band amount in a DSCP of a packet. Further, even when an indicator of a QoS class is not notified to a user plane in a mobile communication system in which a control plane and the user plane are separated, the communication control device 20 can determine a new DSCP, based on a basic DSCP. Thus, a DSCP to be set to a packet can be determined according to a QoS class and a band use amount.

Further, when a use band amount of a QoS flow to which a packet to be transferred belongs exceeds the first threshold value, the packet transfer unit 22 discards the packet. In this way, when a use band amount of a QoS flow exceeds the first threshold value, the communication control device 20 can discard a packet without transferring the packet to the network apparatus 60. Then, a possibility of occurrence of unintended discarding of a packet in the network apparatus 60 due to tightness of a band can be reduced.

Further, when a use band amount of a QoS flow to which a packet to be transferred belongs exceeds the second threshold value, the packet transfer unit 22 sets a value changed from a basic DSCP as a new DSCP. In this way, the communication control device 20 can achieve control for changing, from a basic DSCP, a DSCP to be stored in a packet to be transferred. Further, in this way, a possibility of occurrence of unintended discarding of a packet in the network apparatus 60 due to tightness of a band can be reduced.

Further, the measurement unit 23 measures a use band amount by the TrTCM. In this way, a measurement of the use band amount can be achieved.

Further, the communication control device 20 is a UPF. In this way, for example, the communication control device 20 can be applied to a UPF of the 5G.

[Hardware Configuration Example]

A configuration example of a hardware source that achieves the communication control device (10, 20) according to each of the example embodiments of the present invention described above by using one information processing device (computer) will be described. Note that the communication control device may be achieved by physically or functionally using at least two information processing devices. Further, the communication control device may be achieved as a dedicated device. Further, only a part of a function of the communication control device may be achieved by using the information processing device.

Figure 9:
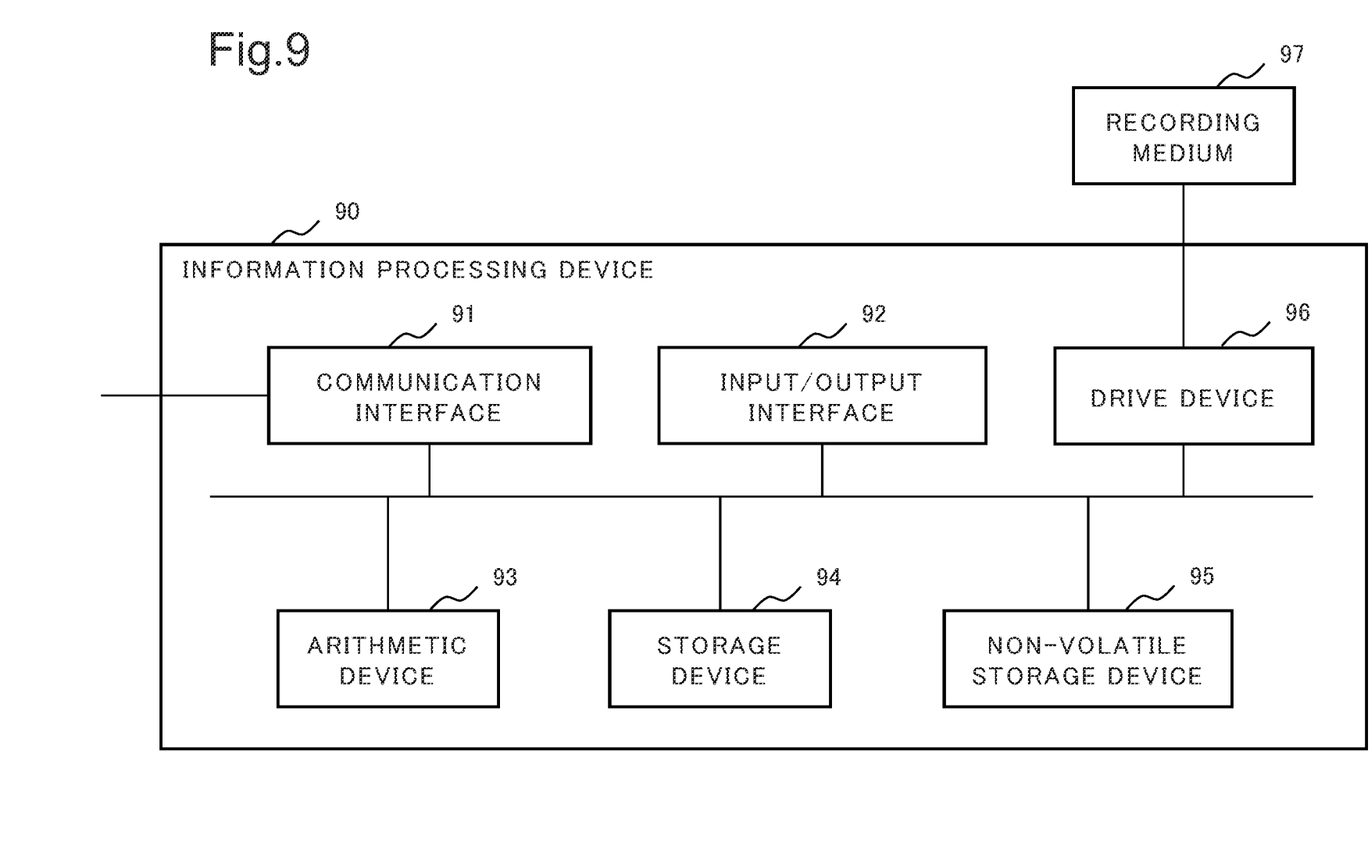
FIG. 9 is a diagram illustrating a hardware configuration example according to each of the example embodiments of the present invention.

FIG. 9 is a diagram schematically illustrating a hardware configuration example of an information processing device that can achieve the communication control device according to each of the example embodiments of the present invention. An information processing device 90 includes a communication interface 91, an input/output interface 92, an arithmetic device 93, a storage device 94, a non-volatile storage device 95, and a drive device 96.

For example, the reception unit 11 and the packet transfer unit 12 in FIG. 1 can be achieved by the communication interface 91 and the arithmetic device 93, and the measurement unit 13 can be achieved by the arithmetic device 93.

The communication interface 91 is a communication means for allowing the communication control device according to each of the example embodiments to communicate with an external device in a wired and/or wireless manner. Note that, when the communication control device is achieved by using at least two information processing devices, the communication control device may be connected in such a way as to be able to mutually perform communication between the information processing devices via the communication interface 91.

The input/output interface 92 is a man-machine interface, such as a keyboard being one example of an input device and a display as an output device.

The arithmetic device 93 is achieved by an arithmetic processing device, such as a general-purpose central processing unit (CPU) and a microprocessor, and a plurality of electric circuits. For example, the arithmetic device 93 can read, in the storage device 94, various types of programs stored in the non-volatile storage device 95, and execute processing according to the read program.

The storage device 94 is a memory device, such as a random access memory (RAM), that can be referred from the arithmetic device 93, and stores a program, various types of data, and the like. The storage device 94 may be a volatile memory device.

The non-volatile storage device 95 is a non-volatile storage device such as a read only memory (ROM) and a flash memory, for example, and can store various types of programs, data, and the like.

For example, the drive device 96 is a device that processes reading and writing of data from and to a recording medium 97 described below.

The recording medium 97 is any recording medium that can record data, such as an optical disk, a magneto-optical disk, and a semiconductor flash memory, for example.

According to each of the example embodiments of the present invention, for example, the communication control device may be formed of the information processing device 90 illustrated in FIG. 9, and the communication control device may be achieved by supplying, to the communication control device, a program that can achieve the function described in each of the above-described example embodiments.

In this case, the example embodiment can be achieved by the arithmetic device 93 executing the program supplied to the communication control device. Further, a part of a function instead of the entire communication control device can also be formed of the information processing device 90.

Furthermore, the communication control device may be constituted in such a way that the above-described program may be recorded in the recording medium 97, and the above-described program is appropriately stored in the non-volatile storage device 95 in a shipment stage, an operation stage, or the like of the communication control device. Note that, in this case, as a method for supplying the above-described program, a method for installing inside the communication control device by using an appropriate jig in a manufacturing stage before shipment, an operation stage, or the like may be adopted. Further, as the method for supplying the above-described program, a general procedure of a method for downloading from the outside via a communication line such as the Internet and the like may be adopted.

The whole or part of the example embodiments disclosed above can be described as, but not limited to, the following supplementary notes.

(Supplementary Note 1)

A communication control device being included in a user plane of a mobile communication system in which a control plane and the user plane are separated, the communication control device including:

a packet transfer unit that transfers a packet to a network apparatus;

a reception unit that receives, from the control plane, a basic DSCP being a differentiated services code point (DSCP) being set to each quality of service (QoS) flow by the control plane according to a QoS class; and a measurement unit that measures a use band amount of the packet for each of the QoS flow, wherein the packet transfer unit determines a new DSCP being a DSCP to be stored in the packet to be transferred, based on the basic DSCP and the use band amount of the QoS flow to which the packet to be transferred belongs, and stores the new DSCP in the packet to be transferred to the network apparatus.

(Supplementary Note 2)

The communication control device according to supplementary note 1, wherein the packet transfer unit discards the packet when the use band amount of the QoS flow to which the packet to be transferred belongs exceeds a first threshold value.

(Supplementary Note 3)

The communication control device according to supplementary note 1, wherein the packet transfer unit sets a value changed from the basic DSCP as the new DSCP when the use band amount of the QoS flow to which the packet to be transferred belongs exceeds a second threshold value.

(Supplementary Note 4)

The communication control device according to supplementary note 1, wherein the measurement unit measures the use band amount by a two rate three color marker (TrTCM).

(Supplementary Note 5)

The communication control device according to any of supplementary notes 1 to 4, wherein the communication control device is a user plane function (UPF).

(Supplementary Note 6)

A communication control method including, in a mobile communication system in which a control plane and a user plane are separated:

receiving, from the control plane, a basic DSCP being a DSCP being set to each QoS flow by the control plane according to a QoS class;

measuring a use band amount of a packet to be transferred for each of the QoS flow;

determining a new DSCP being a DSCP to be stored in the packet to be transferred, based on the basic DSCP and the use band amount of the QoS flow to which the packet to be transferred belongs; and transferring, to a network apparatus, the packet in which the new DSCP is stored.

(Supplementary Note 7)

The communication control method according to supplementary note 6, further including discarding the packet when the use band amount of the QoS flow to which the packet to be transferred belongs exceeds a first threshold value.

(Supplementary Note 8)

The communication control method according to supplementary note 6, further including setting a value changed from the basic DSCP as the new DSCP when the use band amount of the QoS flow to which the packet to be transferred belongs exceeds a second threshold value.

(Supplementary Note 9)

The communication control method according to supplementary note 6, further including measuring the use band amount by a TrTCM.

(Supplementary Note 10)

A non-transitory computer-readable recording medium that records a communication control program of a communication control device included in a user plane of a mobile communication system in which a control plane and the user plane are separated, the communication control program causing a computer to achieve:

a packet transfer function of transferring a packet to a network apparatus;

a reception function of receiving, from the control plane, a basic DSCP being a DSCP being set to each QoS flow by the control plane according to a QoS class; and a measurement function of measuring a use band amount of the packet for each of the QoS flow, wherein the packet transfer function determines a new DSCP being a DSCP to be stored in the packet to be transferred, based on the basic DSCP and the use band amount of the QoS flow to which the packet to be transferred belongs, and stores the new DSCP in the packet to be transferred to the network apparatus.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A communication control device being included in a user plane of a mobile communication system in which a control plane and the user plane are separated, the communication control device comprising one or more memories storing instructions and one or more processors configured to execute the instructions to:

transfer a packet to a network apparatus;

receive, from the control plane, a basic DSCP being a differentiated services code point (DSCP) being set to each quality of service (QoS) flow by the control plane according to a QoS class; and measure a use band amount of the packet for each of the QoS flow, wherein the one or more processors are configured to execute the instructions to determine a new DSCP being a DSCP to be stored in the packet to be transferred, based on the basic DSCP and the use band amount of the QoS flow to which the packet to be transferred belongs, and store the new DSCP in the packet to be transferred to the network apparatus.

2. The communication control device according to claim 1, wherein the one or more processors are configured to execute the instructions to discard the packet when the use band amount of the QoS flow to which the packet to be transferred belongs exceeds a first threshold value.

3. The communication control device according to claim 1, wherein the one or more processors are configured to execute the instructions to set a value changed from the basic DSCP as the new DSCP when the use band amount of the QoS flow to which the packet to be transferred belongs exceeds a second threshold value.

4. The communication control device according to claim 1, wherein the one or more processors are configured to execute the instructions to measure the use band amount by a two rate three color marker (TrTCM).

5. The communication control device according to claim 1, wherein
the communication control device is a user plane function (UPF).

6. A communication control method comprising, in a mobile communication system in which a control plane and a user plane are separated:
receiving, from the control plane, a basic DSCP being a DSCP being set to each QoS flow by the control plane according to a QoS class;
measuring a use band amount of a packet to be transferred for each of the QoS flow;
determining a new DSCP being a DSCP to be stored in the packet to be transferred, based on the basic DSCP and the use band amount of the QoS flow to which the packet to be transferred belongs; and
transferring, to a network apparatus, the packet in which the new DSCP is stored.

7. The communication control method according to claim 6, further comprising
discarding the packet when the use band amount of the QoS flow to which the packet to be transferred belongs exceeds a first threshold value.

8. The communication control method according to claim 6, further comprising
setting a value changed from the basic DSCP as the new DSCP when the use band amount of the QoS flow to which the packet to be transferred belongs exceeds a second threshold value.

9. The communication control method according to claim 6, further comprising
measuring the use band amount by a TrTCM.

10. A non-transitory computer-readable recording medium that records a communication control program of a communication control device included in a user plane of a mobile communication system in which a control plane and the user plane are separated, the communication control program causing a computer to achieve:
a packet transfer function of transferring a packet to a network apparatus;
a reception function of receiving, from the control plane, a basic DSCP being a DSCP being set to each QoS flow by the control plane according to a QoS class; and
a measurement function of measuring a use band amount of the packet for each of the QoS flow, wherein
the packet transfer function determines a new DSCP being a DSCP to be stored in the packet to be transferred, based on the basic DSCP and the use band amount of the QoS flow to which the packet to be transferred belongs, and stores the new DSCP in the packet to be transferred to the network apparatus.

* * * * *